United States Patent
Usuda et al.

(10) Patent No.: US 7,431,517 B2
(45) Date of Patent: Oct. 7, 2008

(54) FOCAL PLANE SHUTTER FOR CAMERAS

(75) Inventors: Yuichirou Usuda, Wako (JP);
Nobuyoshi Inoue, Kawagoe (JP)

(73) Assignee: Nidec Copal Corporation, Tokyo (JP)

( * ) Notice: Subject to any disclaimer, the term of this patent is extended or adjusted under 35 U.S.C. 154(b) by 562 days.

(21) Appl. No.: 11/226,307

(22) Filed: Sep. 15, 2005

(65) Prior Publication Data

US 2006/0056840 A1 Mar. 16, 2006

(30) Foreign Application Priority Data

Sep. 16, 2004 (JP) .............................. 2004-270011

(51) Int. Cl.
*G03B 9/10* (2006.01)
*G03B 9/08* (2006.01)
(52) U.S. Cl. .................. 396/452; 396/488; 396/489
(58) Field of Classification Search ................. 396/452, 396/456, 483–484, 486, 488–492; 348/296, 348/362, 367–368
See application file for complete search history.

(56) References Cited

U.S. PATENT DOCUMENTS

| | | | |
|---|---|---|---|
| 6,726,379 B2 * | 4/2004 | Watabe et al. | 396/456 |
| 2002/0136555 A1 * | 9/2002 | Watabe et al. | 396/453 |

\* cited by examiner

*Primary Examiner*—Bot LeDynh
(74) *Attorney, Agent, or Firm*—Sterne, Kessler, Goldstein & Fox P.L.L.C.

(57) ABSTRACT

A first drive member which rotates with a rotor includes a first cam portion and a second cam portion, and a second drive member which connects a drive pin with a shutter blade member includes a first cam portion and a second cam portion. A circular hole of the link member is fitted to a shaft member which is fixed to the first drive member and an elongated hole thereof is fitted to the shaft member fixed to the second drive member. The first drive member rotates the second drive member first via the link member and subsequently rotates the same directly so that when an abutting portion of the second drive member comes into abutment with an edge of the elongated hole, a generated repulsive force acts toward an axis of rotation of the first drive member irrespective of the direction of rotation of a rotor 7.

8 Claims, 14 Drawing Sheets

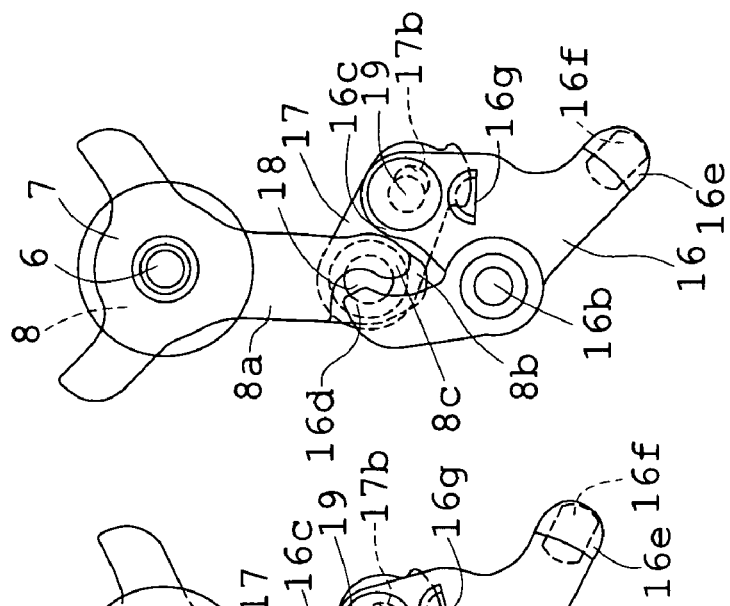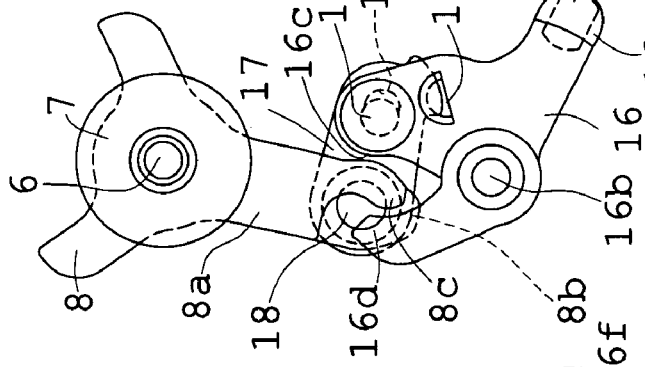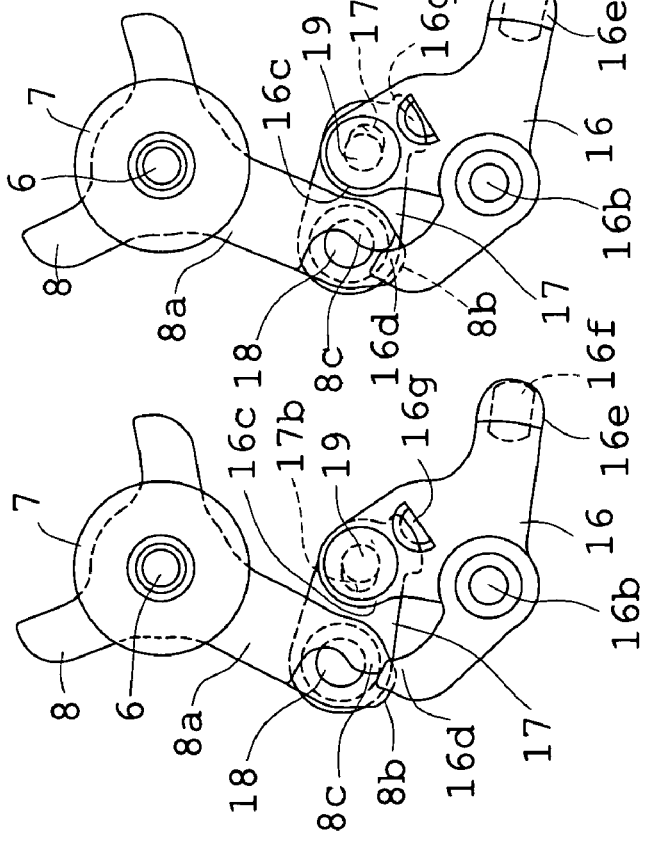

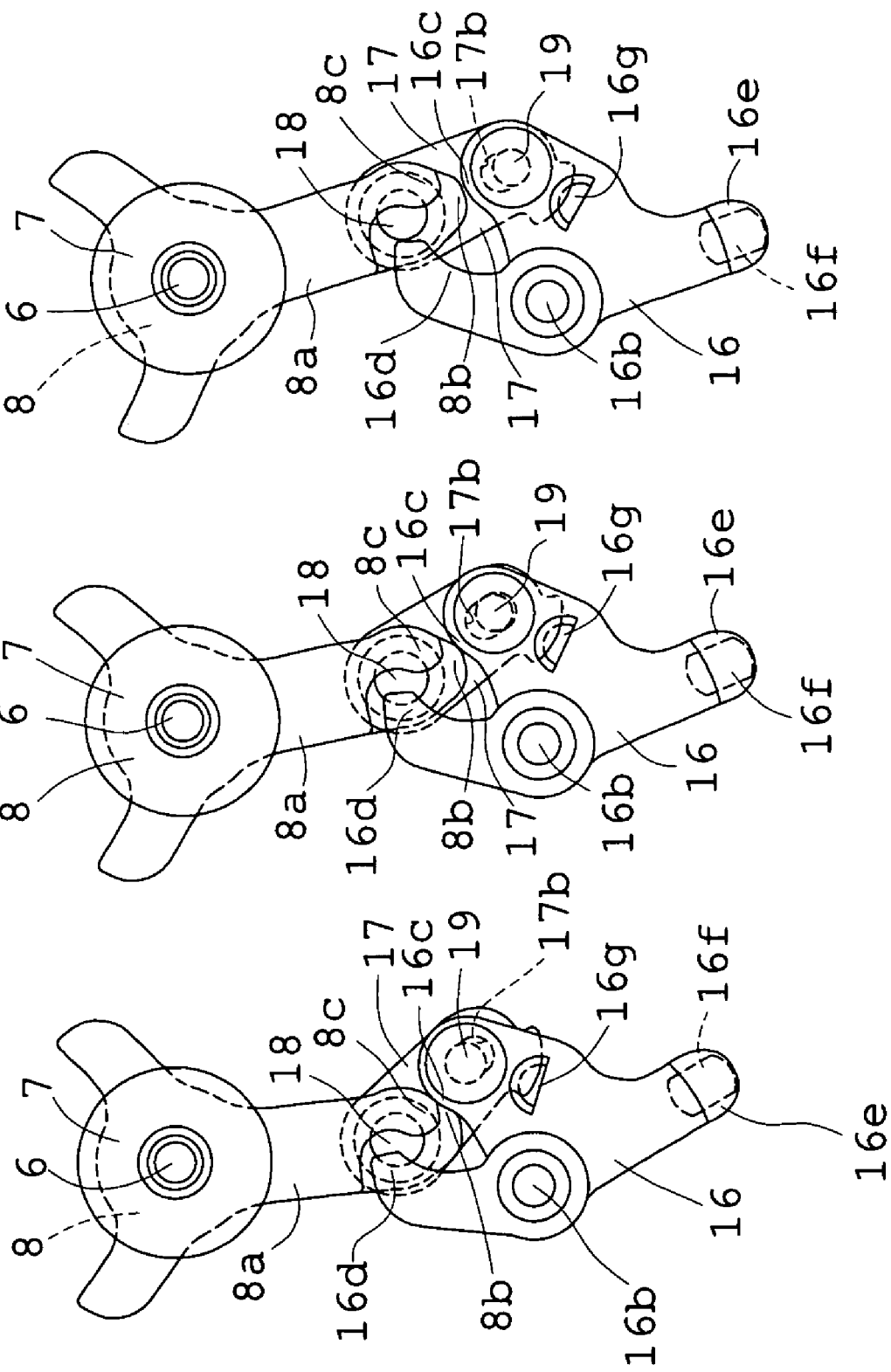
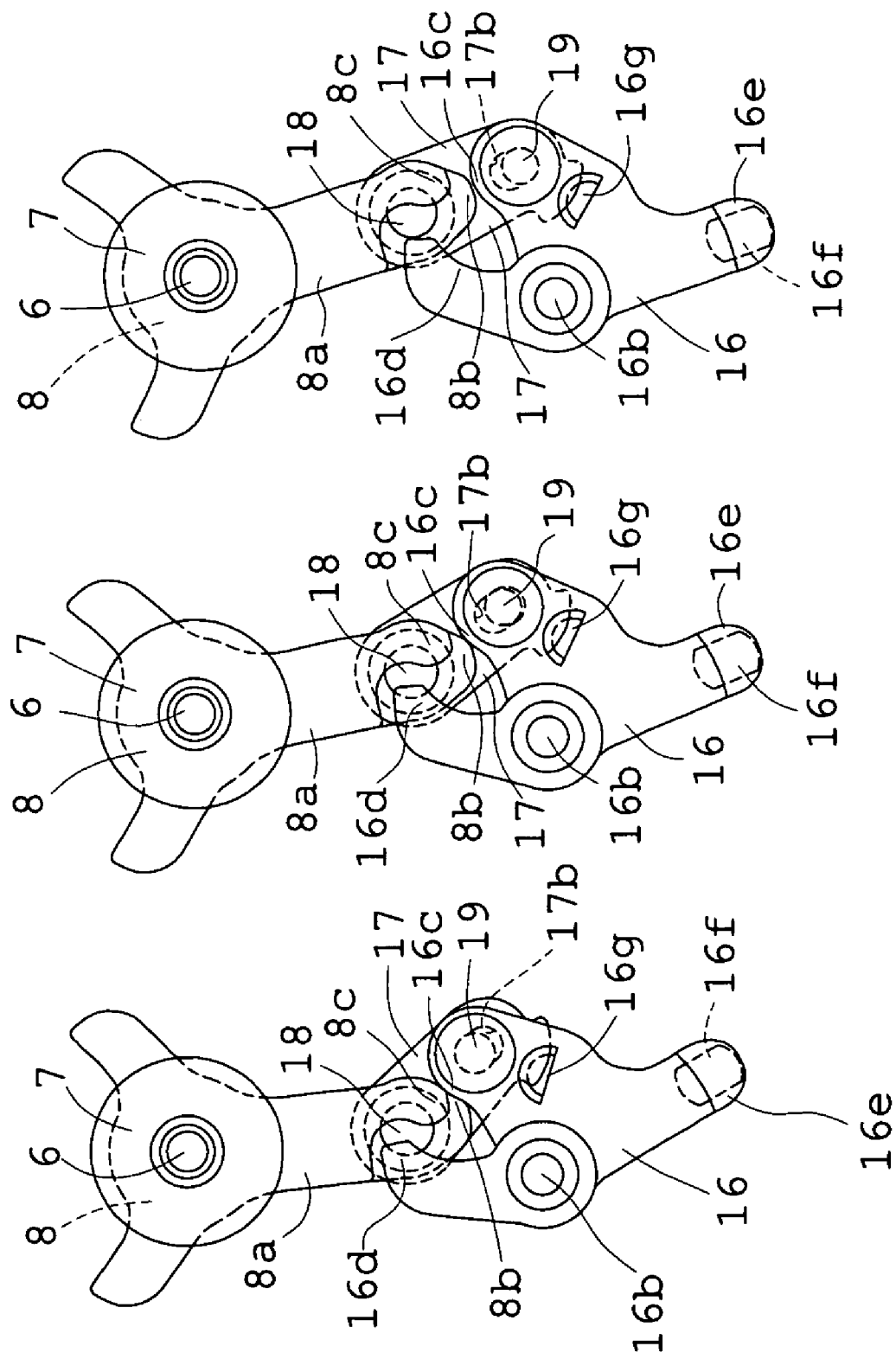
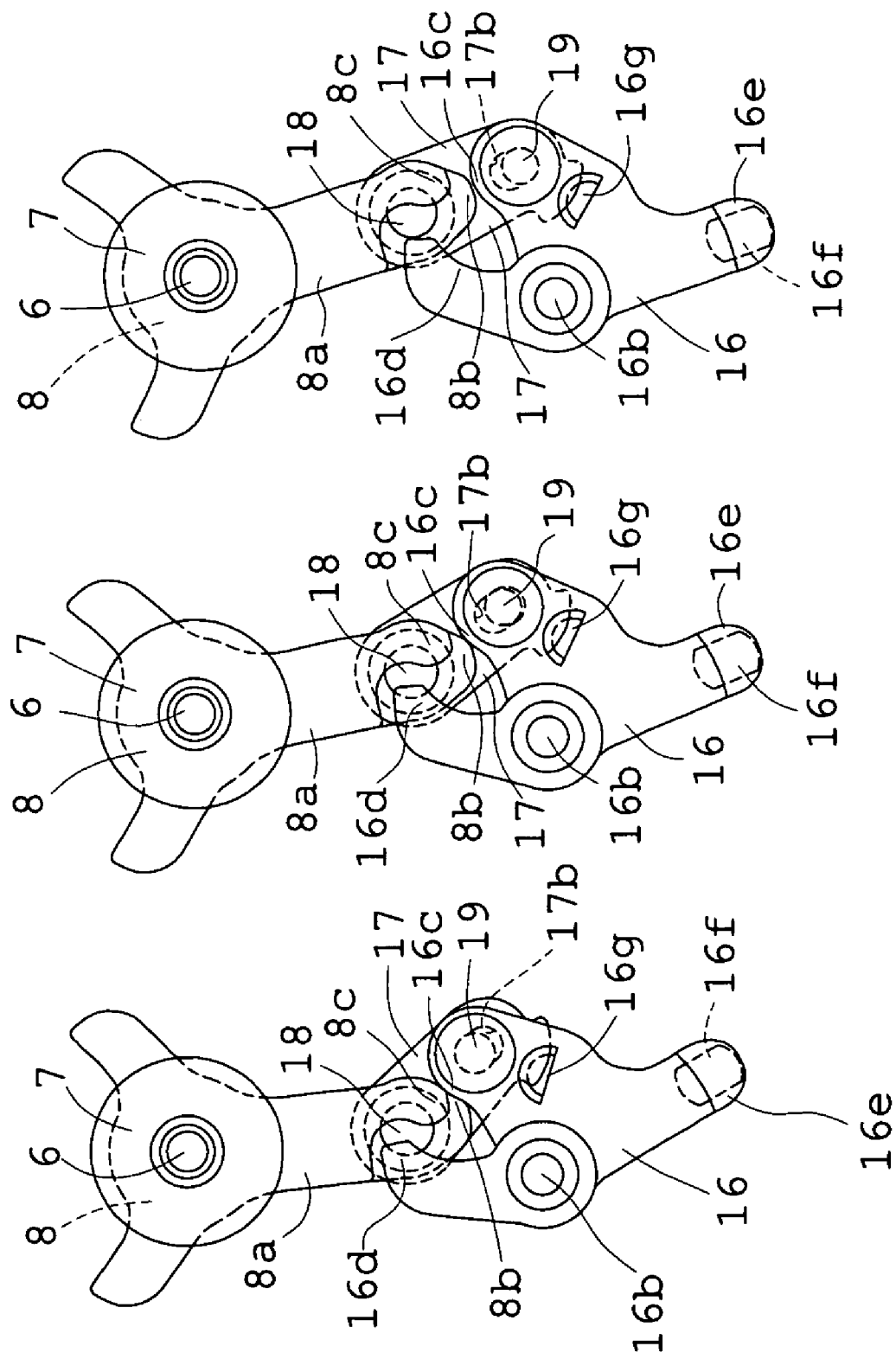

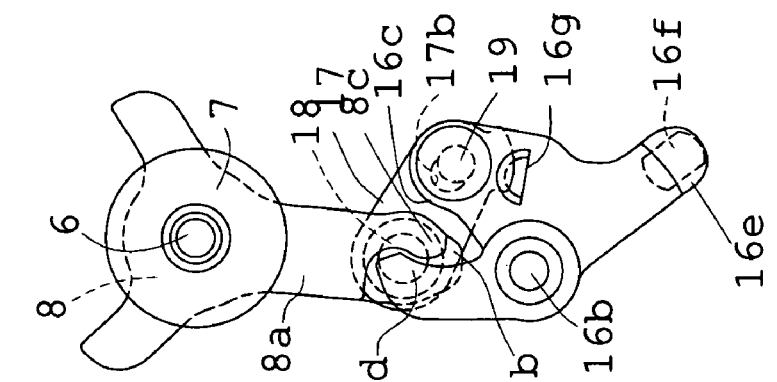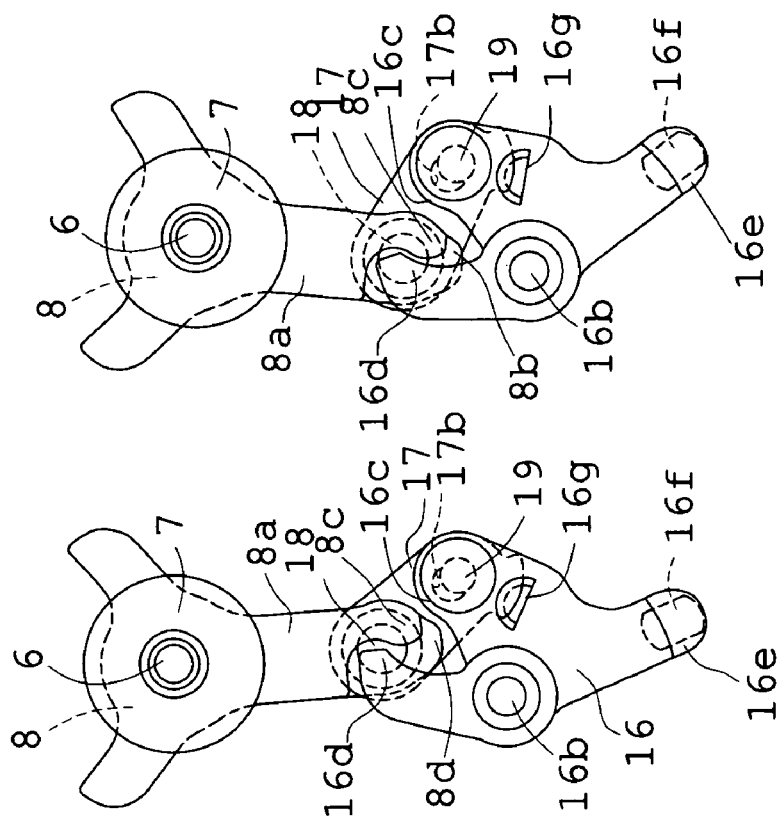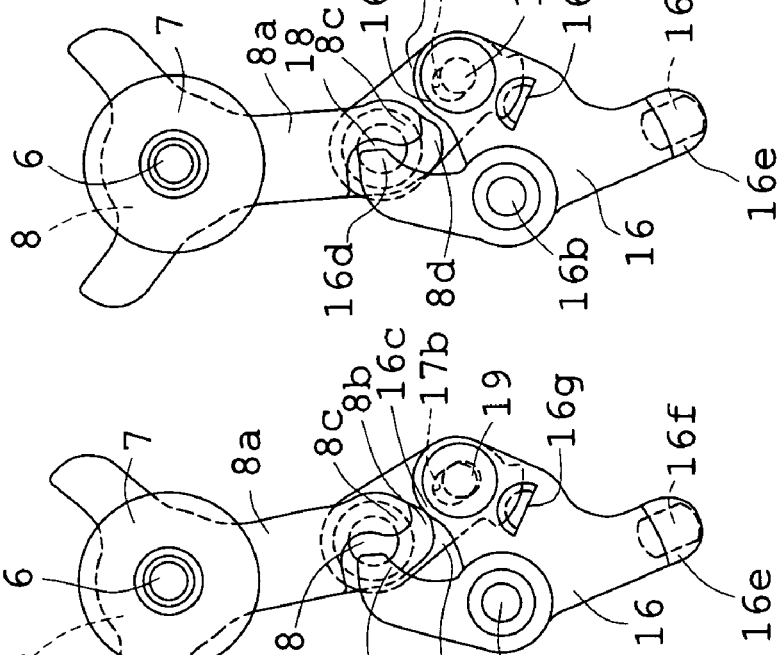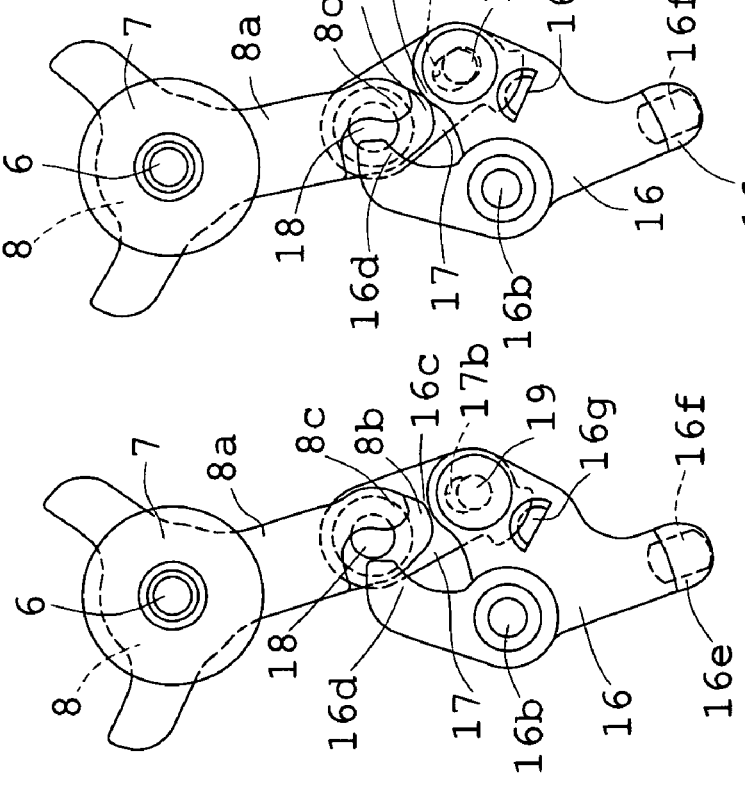

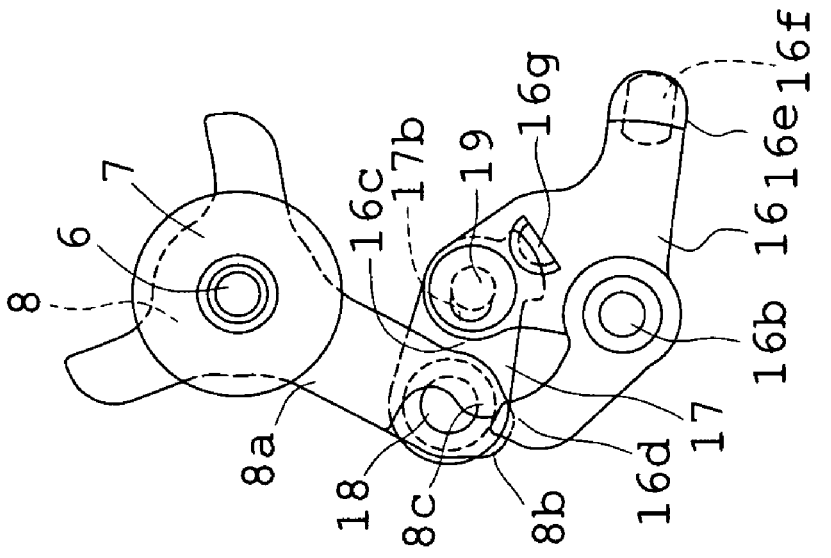
FIG. 7E
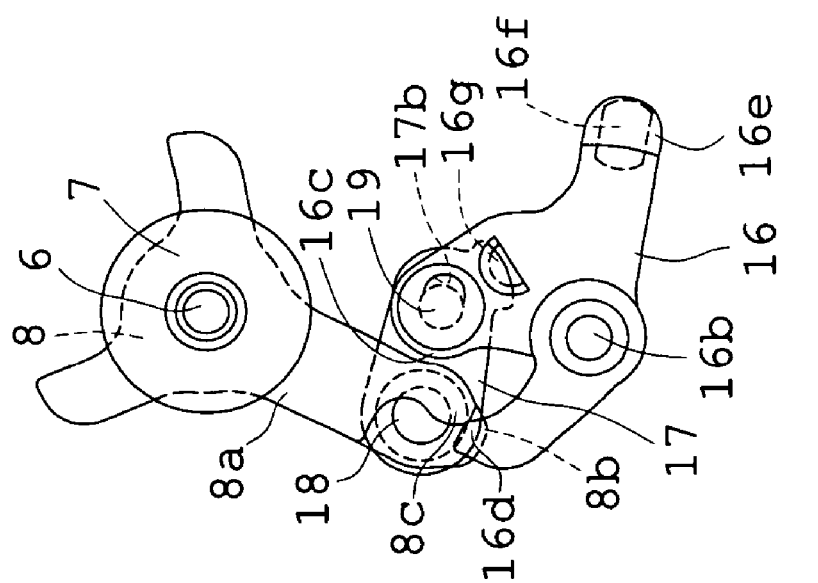
FIG. 7F
FIG. 7G

FOCAL PLANE SHUTTER FOR CAMERAS

This application claims foreign priority based on Japanese Patent application No. 2004-270011, filed Sep. 16, 2004, the content of which is incorporated herein by reference in its entirety.

BACKGROUND OF THE INVENTION

1. Field of the Invention

The present invention relates to a focal plane shutter for cameras having one or two shutter blades.

2. Description of the Related Art

There is a focal plane shutter for cameras of a type having only one shutter blade including a plurality of arms fixed at one end to a base plate, and at least one blade rotatably supported by these arms. Such a focal plane shutter is employed only in digital cameras. A focal plane shutter having two of such shutter blade configured as described above is known since a long time ago, and this type of focal plane shutter is used both in digital cameras and silver salt film cameras. Such focal plane shutters are configured in such a manner that the respective shutter blades connect one arm to a drive pin of a drive member, so that an exposure aperture is opened and closed by reciprocal rotation of the drive member.

In the case of the focal plane shutter in the related art, the drive member is generally rotated in one direction by a set member interlocked with a motor, and in the opposite direction by an urging force of a spring. However, recently, a structure adapted to rotate the drive member reciprocally only by the motor attracts attention and an example in which the drive member is integrated with a rotor of the motor is disclosed in Japanese Patent Laid open Publication No. 2002-287210.

In the case of the focal plane shutter disclosed in Japanese Patent Laid open Publication No. 2002-287210, a stop position of the rotor is maintained by a detent torque obtained by a magnetic force of a permanent magnet of the rotor. However, when an impact or vibrations are applied to the camera, the shutter blade cannot be kept stand-still only by the detent torque. Therefore, there is a problem such that when the shutter blade is moved from the stop position, a start position at the time of photographing changes, and hence an adequate photographing cannot be achieved.

As publicly known, in the case of the focal plane shutter of this type, the drive member does not stop at the end of rotation thereof by the rotor of the motor being stopped, but is stopped by abutting against a stopper. At this time, when the drive member is bounded and is rotated temporarily in the opposite direction, also the shutter blade is operated temporarily in the opposite direction, and hence part of the exposure aperture is opened and closed, which may cause an inconvenient result such as uneven exposure.

In view of such circumstances, referring to the focal plane shutter disclosed in Japanese Patent Laid open Publication No. 2002-287210, a force of the drive member which comes into abutment with the stopper and bounds acts so as to rotate the rotor in the opposite direction from the current direction of rotation. Therefore, when the drive member is rotated at high velocities (that is, when the shutter blade is traveled at high velocities), the bound of the drive member as described above cannot be restrained preferably only by the detent torque which can be obtained by the magnetic force of the permanent magnet of the rotor, and hence the shutter blade may be operated temporarily in the opposite direction.

Therefore, in the case of the focal plane shutter as disclosed in Japanese Patent Laid open Publication No. 2002-287210, a rubber-made shock absorbing member is mounted at an edge of an elongated hole which serves as a stopper for the drive member, so that the bound of the drive member can be restrained as much as possible. However, as publicly known, when the drive member is rotated at high velocities, it is difficult to restrain the bound only with such shock absorbing member, it is additionally necessary to mount shock absorbing members of various shapes or to mount a brake member at different positions on a shutter base plate.

SUMMARY OF THE INVENTION

The object of the invention is to provide a focal plane shutter for cameras including at least one shutter blade to be moved reciprocally by a motor, wherein a drive unit includes a motor, two driving members, and a link member for connecting the drive members so that a start position of the shutter blade can be maintained preferably, and a bound as described above can preferably be restrained.

In order to achieve the above-described object, the invention is a focal plane shutter for cameras including:

at least one blade chamber composed of two base plates, each of which having an exposure aperture, the two base plates defining a blade chamber therebetween, a plurality of arms rotatably mounted their one end to one of the base plates, and at least one shutter blade being rotatably supported by the arms, the plurality of arms and the at least one shutter blade being arranged in the blade chamber; and at least one drive unit mounted to one of the base plates for causing the shutter blade to move reciprocally, wherein the drive unit includes a motor having a rotor which can rotate reciprocally, a first drive member which rotates reciprocally with the rotor, a second drive member having a drive pin which is connected to one of the arms in the blade chamber and rotatably mounted to any one of the base plates so as to make the shutter blade move reciprocally and rotatably, and a link member connecting its one end to the first drive member and the other end to the second drive member to transmit reciprocal rotation of the first drive member to the second drive member, and wherein the second drive member is in a state of being capable of coming into direct contact with the first drive member in the vicinity of a stop position thereof, so that a force from the second drive member acts in the direction of an axis of rotation of the first drive member.

In this case, in the structure in which the first drive member has a cam portion in the vicinity of a joint with respect to the link member, and the second drive member has a cam portion in the vicinity of the joint with respect to the link member, so that the first drive member first causes the second drive member to rotate via the link member when the rotor is rotated in a first direction, and subsequently the cam portion of the first drive member pushes the cam portion of the second drive member to cause the second drive member to rotate, a compact structure which provides a desirable function is achieved.

In the structure in which the first drive member includes a second cam portion in the vicinity of the joint with respect to the link member, and the second drive member includes a second cam portion at a position apart from the joint with respect to the link member, so that the second cam portion of the second drive member abuts against the second cam portion of the first drive member when the rotor rotates in a second direction, a further preferable structure is achieved.

When the rotor and the first drive member are adapted to be capable of rotating integrally on the same axis of rotation, the drive unit can be downsized. On the other hand, when the rotor and the first drive member are adapted to be capable of rotating on different axes of rotation, flexibility in layout is increased. Furthermore, when the link member is connected to one of the two drive members with a joint structure between a shaft and a round hole and to the other drive member with a joint structure between a shaft and an elongated hole, a practical structure is achieved. Moreover, when the second drive member is adapted to come into contact with the first drive member when the operation of the shutter blade is ended and the second drive member is brought into abutment with a stopper the bound can be restrained preferably.

According to the present invention, in a focal plane shutter for cameras comprising at least one shutter blade to be moved reciprocally by a motor, the drive unit for the shutter blade includes the motor, the two drive members, and the link member connecting the drive members, and the rotation of the rotor of the motor is transmitted to the shutter blade mainly via the first drive member, the link member, and the second drive member. However, the two drive members can come into contact with each other in the vicinity of the stop positions thereof, and the force generated on the side of the second drive member is directly transmitted from the second drive member to the first drive member so as to be capable of acting in the direction of the axis of rotation of the first drive member. Therefore, when an impact or vibrations are applied to a camera in the state in which the motor is stopped, the force generated on the side of the second drive member (the side of the shutter blade) can hardly act in the direction to rotate the rotor of the motor.

When the second drive member comes into abutment with the stopper and is about to bound at the end of travel of the shutter blade, the second drive member immediately comes into abutment with the first drive member and the force acts in the direction of the axis of rotation of the first drive member. Therefore, the force in the direction of rotation does not act on the rotor of the motor, and hence the bound can preferably be restrained.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 4A is a plan view for explaining an operating state of the shutter blade drive unit during an opening travel of a shutter blade;

FIG. 4B is a plan view for explaining the operating state of the shutter blade drive unit during the opening travel of the shutter blade;

FIG. 4C is a plan view for explaining the operating state of the shutter blade drive unit during the opening travel of the shutter blade;

FIG. 4D is a plan view for explaining the operating state of the shutter blade drive unit during the opening travel of the shutter blade;

FIG. 4E is a plan view for explaining the operating state of the shutter blade drive unit during the opening travel of the shutter blade;

FIG. 4F is a plan view for explaining the operating state of the shutter blade drive unit during the opening travel of the shutter blade;

FIG. 4G is a plan view for explaining the operating state of the shutter blade drive unit during the opening travel of the shutter blade;

FIG. 7A is a plan view explaining the operating state of the shutter blade drive unit during a closing travel of the shutter blade;

FIG. 7B is a plan view explaining the operating state of the shutter blade drive unit during the closing travel of the shutter blade;

FIG. 7C is a plan view explaining the operating state of the shutter blade drive unit during the closing travel of the shutter blade;

FIG. 7D is a plan view explaining the operating state of the shutter blade drive unit during the closing travel of the shutter blade;

FIG. 7E is a plan view explaining the operating state of the shutter blade drive unit during the closing travel of the shutter blade;

FIG. 7F is a plan view explaining the operating state of the shutter blade drive unit during the closing travel of the shutter blade;

FIG. 7G is a plan view explaining the operating state of the shutter blade drive unit during the closing travel of the shutter blade;

DETAILED DESCRIPTION OF THE PREFERRED EMBODIMENTS

A focal plane shutter according to a first embodiment which will be described referring to FIG. 1 to FIG. 8 has only one shutter blade, and can be used only for digital cameras. In the case of a focal plane shutter of this type, even when the structure is the same, it is operated by one of two operating sequence (normally open type and normally close type) depending on the specification of the camera. In this specification, the case operated in the normally close type will be described.

A focal plane shutter described according to a second embodiment referring mainly to FIG. 9 to FIG. 12 has two shutter blades, and can be used both for digital cameras and silver salt film cameras. When it is employed in a digital camera, it is operated in one of the above described two operating sequence. The operation of the normally close type is substantially the same as the operation in the case of being employed in a silver salt film camera. Therefore, the operation of the second embodiment will be described relating to the case of being employed in digital cameras and of being operated in the normally close system in detail.

First Embodiment

Figure 1:
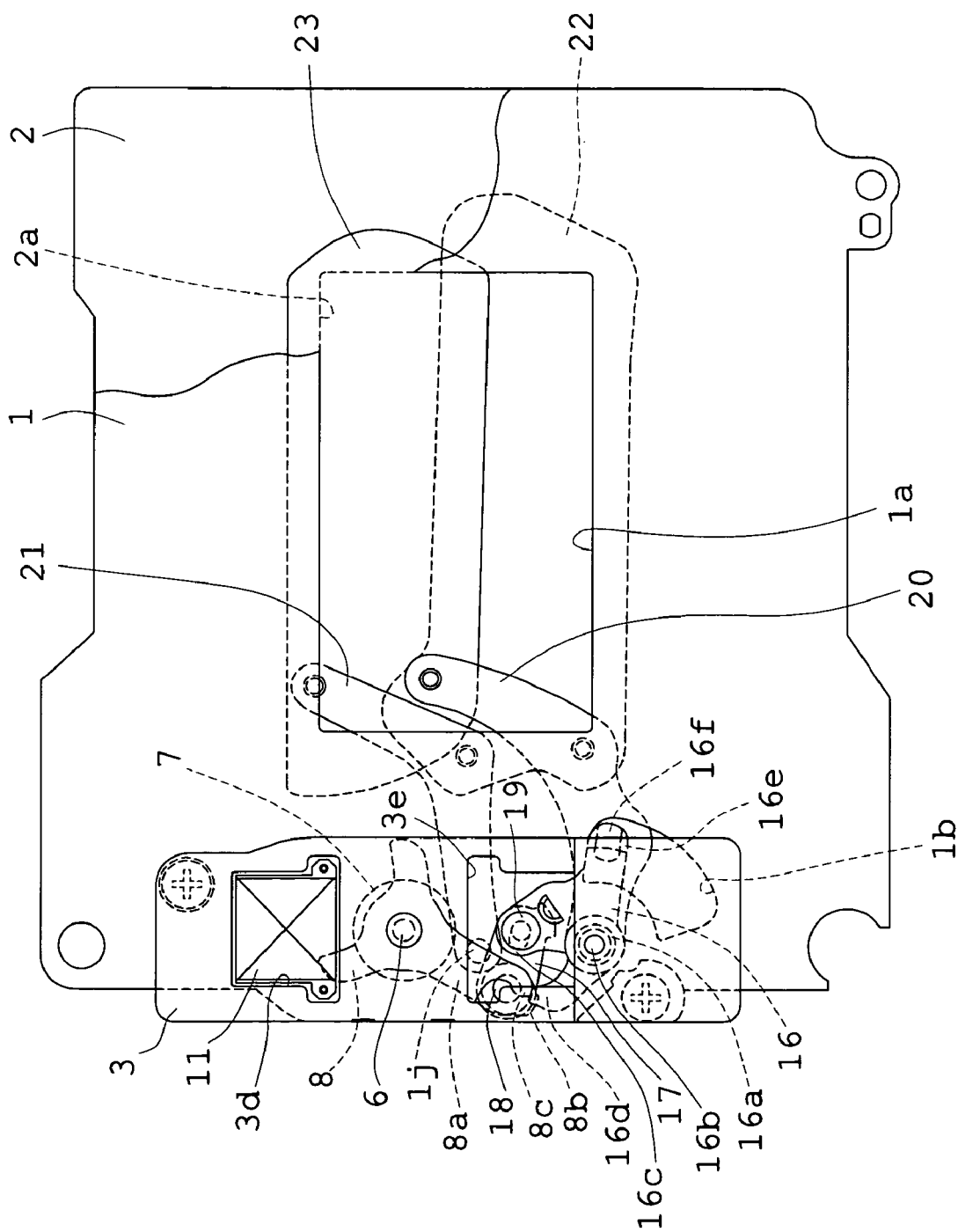
FIG. 1 is a plan view of a first embodiment of the invention showing a state in which an exposure aperture is closed.
Figure 2:
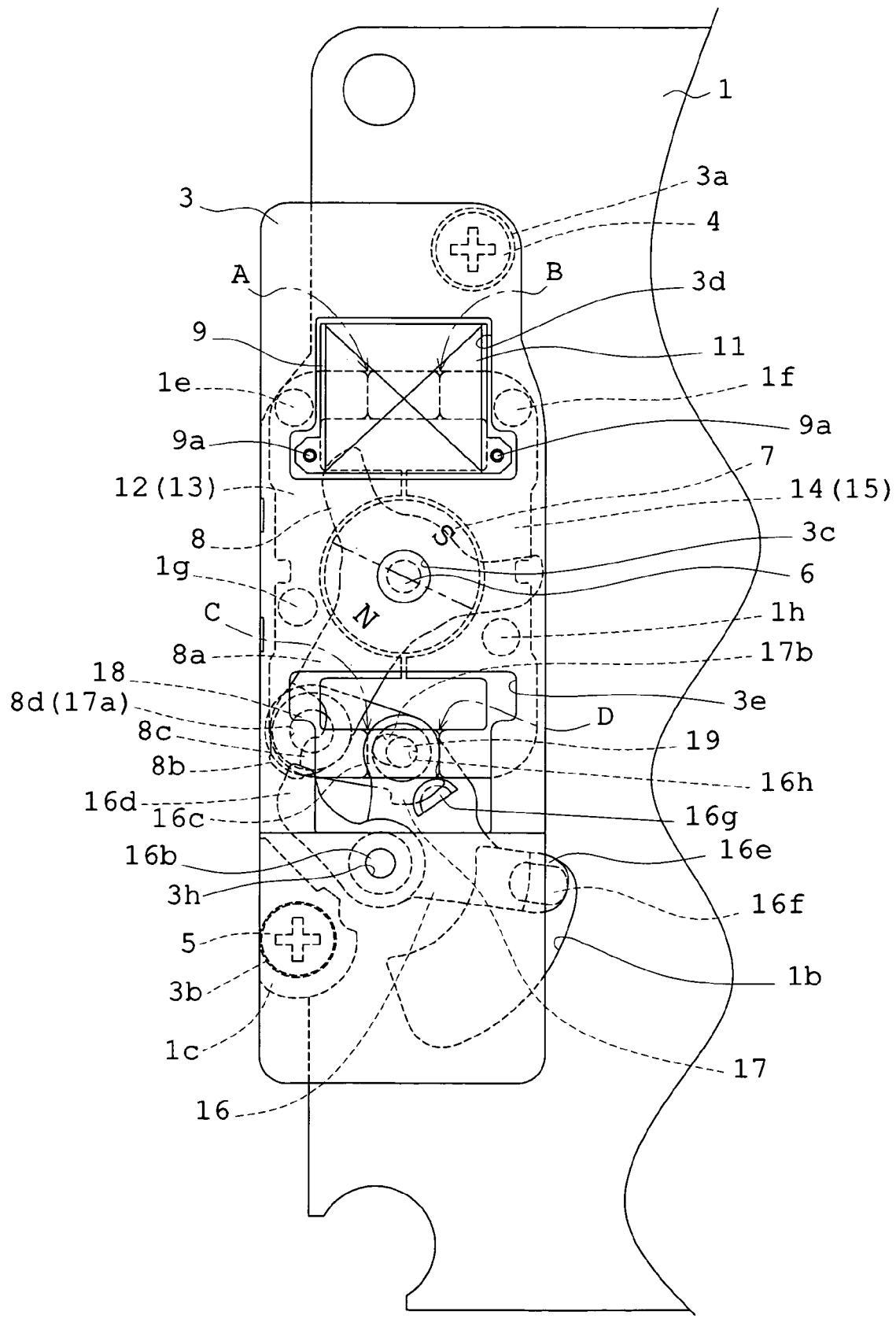
FIG. 2 is an enlarged plan view of a shutter blade drive unit shown in FIG. 1.
Figure 3:
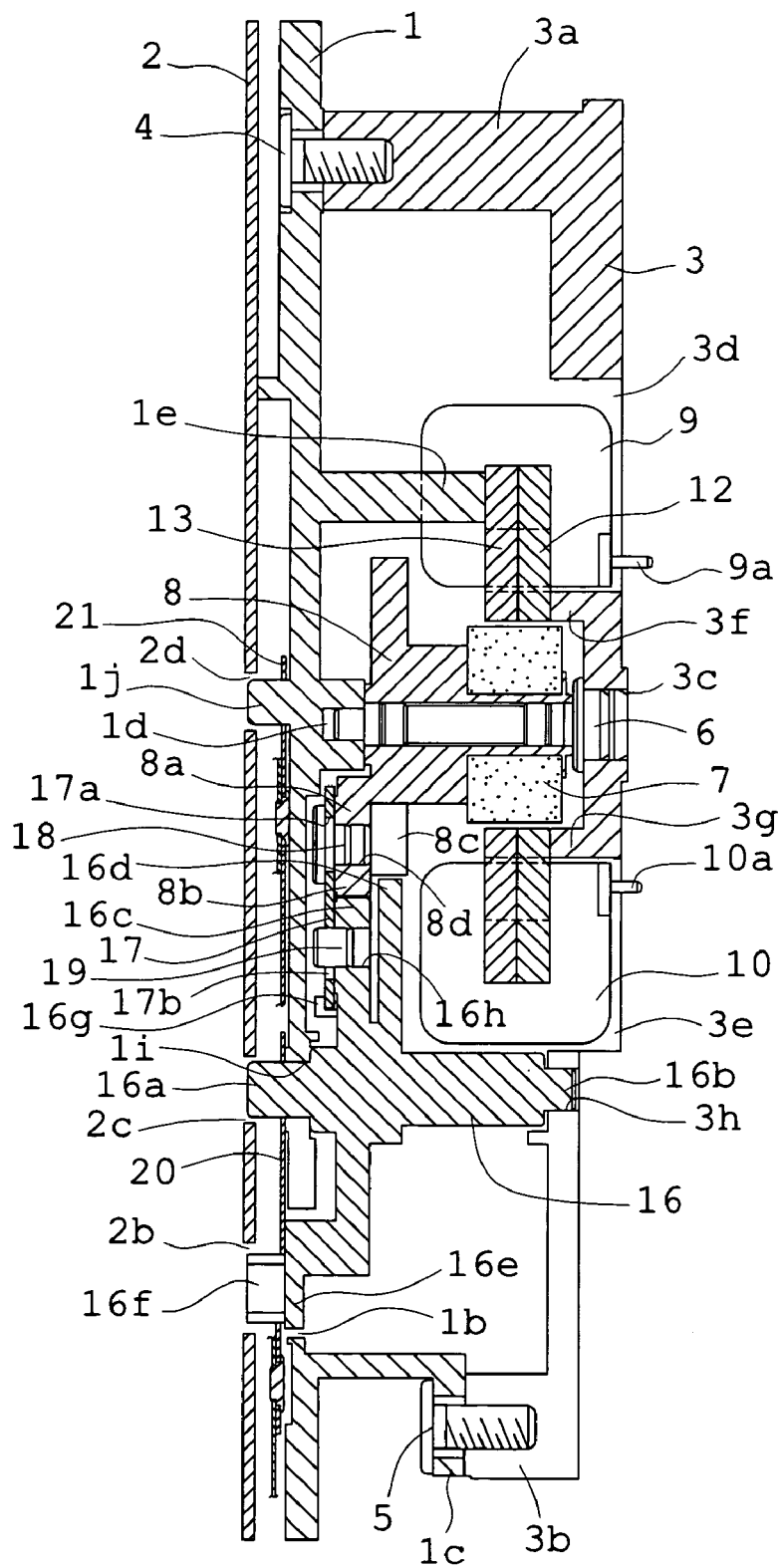
FIG. 3 is a cross-sectional view viewed from the left side of FIG. 2 showing a structure of the shutter blade drive unit in a comprehensive manner.
Figure 5:
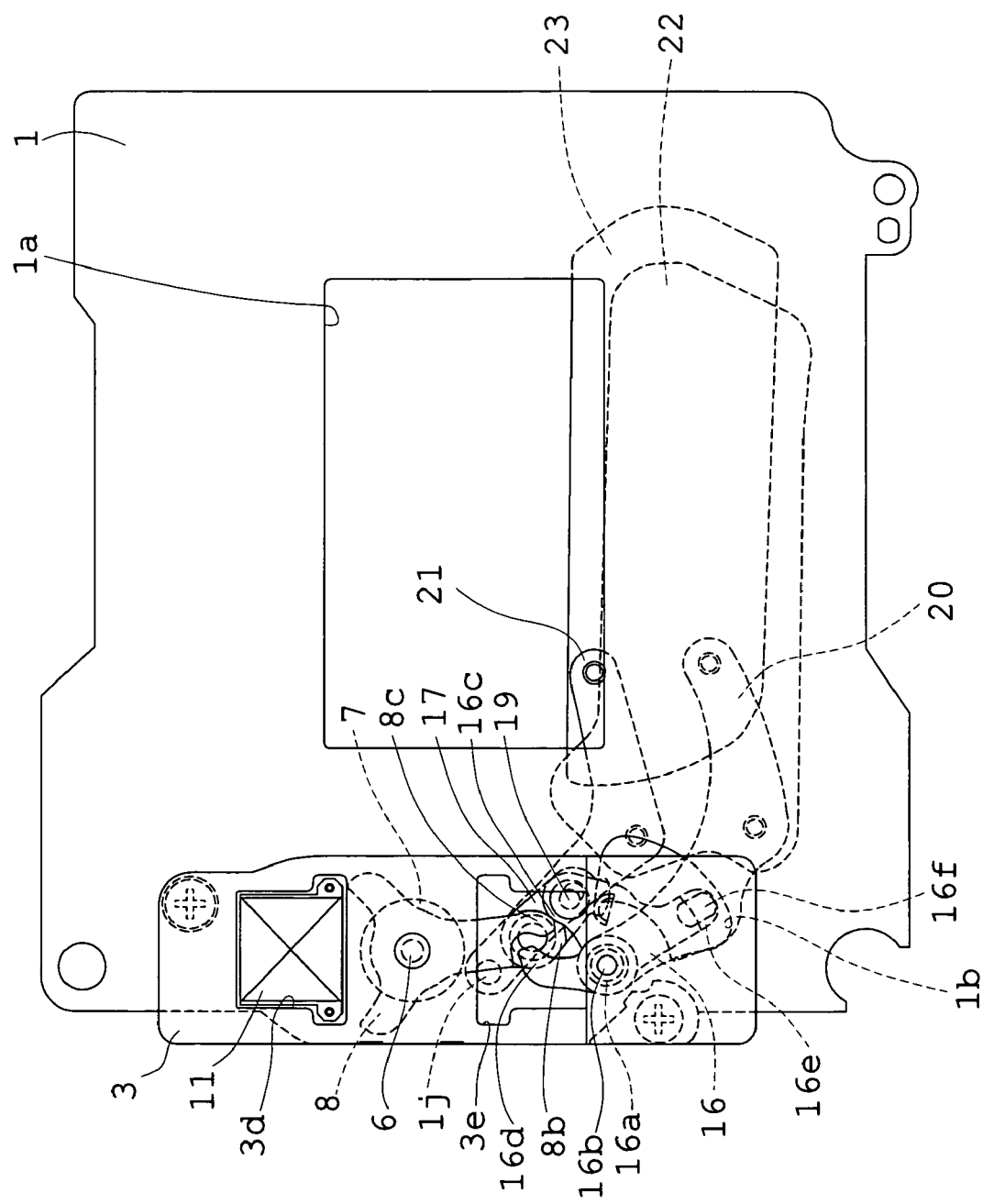
FIG. 5 is a plan view showing a state of the shutter blade right before the end of an opening process of the exposure aperture after the shutter blade has started the opening operation from the state shown in FIG. 1.
Figure 6:
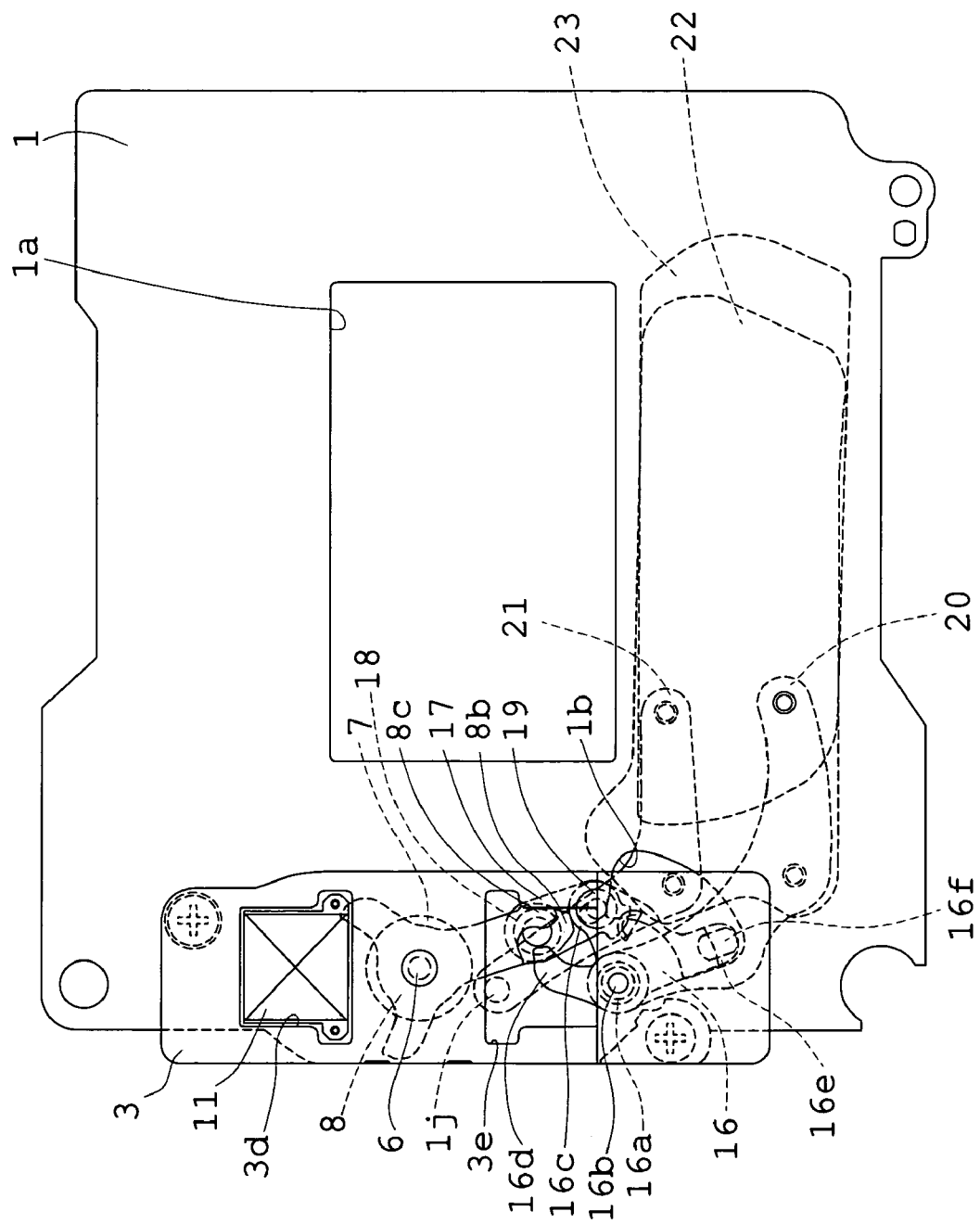
FIG. 6 is a plan view showing a state of the shutter blade stopped right after the exposure aperture is opened completely after the shutter blade has continued the opening operation from the state shown in FIG. 5.
Figure 8:
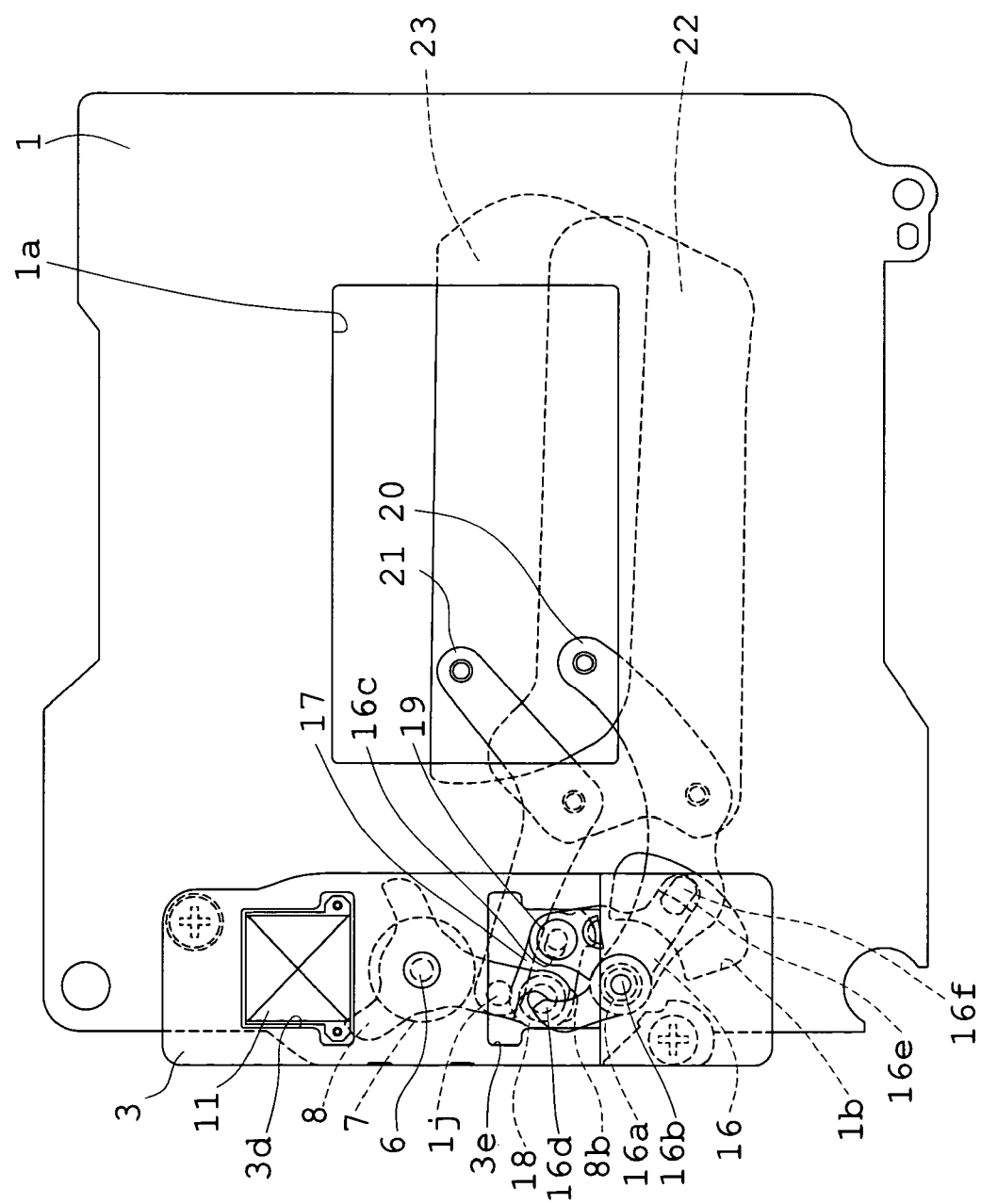
FIG. 8 is a plan view showing a state in which the exposure aperture is closed by substantially ⅔ after the shutter blade has started the closing operation from the state shown in FIG. 6.

Referring now to FIG. 1 to FIG. 8, the first embodiment will be described. FIG. 1 is a plan view showing a state in which an exposure aperture is closed (initial state); and FIG. 2 is an enlarged plan view of a shutter blade drive unit shown in FIG. 1; FIG. 3 is a cross-sectional view viewed from the left side of FIG. 2 showing a structure of the drive unit in a comprehensive manner; FIGS. 4A to 4G are plan views for explaining an operating state of the drive unit during an opening travel of the shutter blade, FIG. 5 is a plan view showing a state of the shutter blade right before the end of an opening process of the exposure aperture after the shutter blade has started the opening operation from the state shown in FIG. 1; FIG. 6 is a plan view showing a state of the shutter blade stopped right after the exposure aperture is opened completely after the shutter blade has continued the opening operation from the state shown in FIG. 5; FIGS. 7A to 7G are plan views explaining the operating state of the drive unit during a closing travel of the shutter blade; FIG. 8 is a plan view showing a state in which the exposure aperture is closed by substantially ⅔ after the shutter blade has started the closing operation from the state shown in FIG. 6.

The structure of this embodiment will be described. The shutter base plate 1 is formed of synthetic resin, and in FIG. 1, which is a cross-sectional view from a part of an upper right portion, an opening 1a of a laterally elongated rectangular shape is formed substantially at the center thereof, and an arcuate elongated hole 1b is formed at a lower left position of the opening 1a. An auxiliary base plate 2 having substantially the same contour as the shutter base plate 1 is mounted to a back side of the shutter base plate 1 at a predetermined distance there from by means not shown, and defines a blade chamber with the shutter base plate 1. The auxiliary base plate 2 is also formed with an opening 2a in a same shape with above-described opening 1a substantially at the center thereof. In the following description, it is assumed that the opening 1a of the shutter base plate 1 constrains the exposure aperture for an optical path for a photographic subject. The auxiliary base plate 2 is also formed with an elongated hole 2b (see FIG. 3) in same shape at a position overlapped with the elongated hole 1b of the shutter base plate 1.

A frame body 3 is formed of synthetic resin and, as is clear from FIG. 2 and FIG. 3, includes two columns 3a, 3b of column shapes on the side of the shutter base plate 1. One of the columns 3a is directly screwed into a plate surface of the shutter base plate 1 by a screw 4, and the other column 3b is screwed into a shelf portion 1c formed on the shutter base plate 1 by a screw 5. As it is clear from FIG. 2, a circular hole 3c is formed substantially at the center of the frame body 3, and two large windows 3d, 3e in convex shapes are formed with the intermediary of the hole 3c.

As clearly shown in FIG. 3, a metallic shaft 6 is press-fitted its one end into the above-described hole 3c and the other end into a hole 1d on the shutter base plate 1. The integration of the rotor 7 made of permanent magnet and a first drive member 8 made of synthetic resin formed with the forming process is rotatably fitted on the shaft 6. The rotor 7 is magnetized in two poles in the radial direction as will be seen in FIG. 2. The first drive member 8 is formed into two-step shape at a distal end of an arm portion 8a thereof which protrudes radially from an axis of rotation to a large extent. A first cam portion 8b is formed on the side of the shutter base plate 1, and a second cam portion 8c is formed on the side of the frame body 3, and the shape will be understood clearly by FIG. 4A.

A stator which constitutes a motor with the rotor 7 described above includes four yokes, and two coils wound around bobbins respectively. The two bobbins 9, 10 are shown in FIG. 3. Although one of the bobbins 9 is shown with a coil 11 wound thereon in FIG. 2, the other bobbin 10 is omitted from the drawing together with the coil wound thereon. The two bobbins 9, 10 are provided with two each of terminal pins 9a, 10a respectively. As is seen from FIG. 3, the bobbins 9, 10 are partly inserted into the windows 3d, 3e of the frame body 3, so that the terminal pins 9a, 10a are projected rightward from the windows 3d, 3e.

The four yokes 12, 13, 14, 15 are arranged two by two on each left and right sides in an overlapped manner in FIG. 2, and both ends of the respective yokes are inserted into a hollow portion of the bobbins 9, 10. Out of those yokes, two on the left sides 12, 13 are also shown in FIG. 3. The yokes 12, 14 out of the yokes 12, 13, 14, 15 which are arranged on the side of the frame body 3 are inserted from both sides into the hollow portion of the bobbin 9 till one end of both get to the position A shown in FIG. 2, and are inserted from both sides into the hollow portion of the bobbin 10, not shown in FIG. 2, till the other end get to the position D. On the other hand, the yokes 13, 15 arranged on the side of the shutter base plate 1 insert their ends into the hollow portion of the bobbin 9 to the position B shown in FIG. 2, and the other ends into the hollow portion of the bobbin 10, not shown in FIG. 2, to the position shown by C. Therefore, the yoke 12 is overlapped not only with the yoke 13, but also with the yoke 15 in the hollow portions of the two bobbins 9, 10, and the yoke 13 is overlapped not only with the yoke 12, but also with the yoke 14. In addition, the yokes 12, 13 and the yokes 14, 15 each include an arcuate magnetic pole section at the longitudinal centers thereof, which are opposed to a peripheral surface of the rotor 7 from both sides.

The stator in this arrangement is mounted temporarily to the frame body 3, and is to be fixed between the shutter base plate 1 and the frame body 3 finally. Therefore, the mounting structure will be described. The shutter base plate 1 is provided with four columns 1e, 1f, 1g, 1h so as to extend upright as shown in FIG. 2, and in FIG. 3, only the column 1e is shown. Although the frame body 3 is also provided with four columns so as to extend upright therefrom in addition to the two columns 3a, 3b already described, however, those four columns are not shown in FIG. 2 at all, and only two columns 3f, 3g out of them are shown in FIG. 3. The frame body 3 further includes a plurality of flexible hook portions, not shown, so as to extend toward the shutter base plate 1.

The stator is mounted temporarily to the frame body 3 in such a manner that part of the bobbins 9, 10 are inserted into the windows 3d, 3e of the frame body 3, and then the yokes 13, 15 arranged on the side of the shutter base plate 1 are engaged with the above-described plurality of hook portions not shown. At this time, the yoke 12 is substantially in contact with distal ends of the two columns 3f, 3g of the frame body 3, and the yoke 14 is also substantially in contact with distal ends of the two columns, not shown, of the frame body 3. When the frame body 3 is mounted to the shutter base plate 1 with the screws 4, 5 thereafter, the stator is fixed steadily by clamping the yokes 12, 13 between the columns 1e, 1g and the columns 3f, 3g and by clamping the yokes 14, 15 between the columns 1f, 1h and the two columns of the frame body 3, not shown.

Subsequently, a second drive member 16 and a link member 17 are described. The second drive member 16 is made of synthetic resin as the first drive member 8, and as seen from FIG. 3, one of shaft portions 16a is rotatably fitted to a hole 1i of the shutter base plate 1, and a distal end thereof is inserted into a hole 2c formed on the auxiliary base plate 2, and the other shaft portion 16b is rotatably fitted to a hole 3h of the frame body 3. The second drive member 16 includes a first cam portion 16c, a second cam portion 16d, an abutting portion 16e, a drive pin 16f, and a supporting portion 16g. Among others, the first cam portion 16c is adapted to be capable of being pushed by the first cam portion 8b of the first drive member 8, and the second cam portion 16d is adapted to be capable of being pushed by the second cam portion 8c of the first drive member 8. The abutting portion 16e is adapted to be capable of abutting against the elongated hole 1b formed on the shutter base plate 1 at both ends in the longitudinal direction thereof. The drive pin 16f is penetrated through the elongated hole 1b and the distal end thereof is inserted into the elongated hole 2b (see FIG. 3) formed on the auxiliary base plate 2. In addition, the supporting portion 16g is a portion formed into a shelf shape on the side of the shutter base plate 1 as shown in FIG. 3.

The link member 17 is a planar member with a circular hole 17a at its one end and an elongated hole 17b at its other end. The link member 17 is connected to the first drive member 8 and the second drive member 16 by two shaft members 18, 19. In other words, as shown in FIG. 3, the shaft member 18 formed into a flanged shape is rotatably fitted into the circular hole 17a formed on the link member 17, and a distal end thereof is press-fitted into the hole 8d formed in the vicinity of the first cam portion 8b of the first drive member 8. On the other hand, the other shaft member 19 is press-fitted into a hole 16h formed in the vicinity of the first cam portion 16c of the second drive member 16, and a distal end thereof is protruded toward the shutter base plate 1. Since the protruded distal end is simply inserted into the elongated hole 17b of the link member 17, it is adapted in such a manner that part of the link member 17 is supported by the above-described supporting portion 16g in order to achieve smooth operation.

Subsequently, a structure of the shutter blade disposed in the blade chamber will be described. The shutter blade of the present embodiment includes two arms 20, 21, and two blades 22, 23. Firstly, the arm 20 is rotatably fitted its one end in the longitudinal direction to the shaft portion 16a (see FIG. 3) of the second drive member 16, and the drive pin 16f is fitted into the known elongated hole, not clearly shown here. The shutter base plate 1 is provided with a shaft portion 1j on a surface on the side of the blade chamber, a distal end thereof is inserted into a hole 2d (see FIG. 3) formed on the auxiliary base plate 2, and one end of the arm 21 is rotatably fitted to the shaft portion 1j. Then, as publicly known, the two blades 22, 23 are rotatably supported via two connecting shafts with respect to the both arms 20, 21 in sequence, respectively.

Subsequently, referring mainly to FIG. 1 and FIG. 4 to FIG. 10, the operation of the present embodiment will be described. As well known, the operation of the shutter blade for digital cameras is performed in any one of two sequences. One is referred to as normally close type which starts from the initial state (standby state for photographing) in which the shutter blade closes the exposure aperture immediately when the release button is pressed for photographing. The other is referred to as normally open type in which the state shutter blade completely opens the exposure aperture is the initial state, and the shutter blade will not be operated immediately even when the release button is pressed for photographing, and starts from the initial state in the final stage of the photographing. Although the shutter of the present embodiment can be operated in any sequences, following is a detailed description for the case which is operated in the sequence of the normally close type as described above.

FIG. 1 shows the initial state in which the shutter blade closes the opening (exposure aperture) 1a, and FIG. 4A shows a principal structure of the drive unit in this state. At this time, the second drive member 16 is located at a rotational limit position in the counterclockwise direction, and the abutting portion 16e comes into abutment with the upper end of the elongated hole 1b of the shutter base plate 1 in the longitudinal direction thereof. The coil 11 and the other coil not shown are not supplied with an electric current, and this state is preferably maintained. In other words, at this time, for the two magnetic pole sections of the rotor 7 and substantially two magnetic pole sections formed by the four yokes 12, 13, 14, 15 are set in opposed positions as shown in FIG. 2, and hence a clockwise rotational force is exerted to the rotor 7, and a counterclockwise rotational force is exerted to the second drive member 16 via the first drive member 8 and the link member 17. Therefore, at this time, as shown in FIG. 4A, the shaft member 19 is in contact with a right end of the elongated hole 17b.

In FIG. 4A, it seems that the second cam portion 16d of the second drive member 16 is in abutment with the second cam portion 8c of the first drive member 8. However, there is a very minute clearance exists in fact, and both are not in complete contact with each other. The reason is that it is very difficult to manufacture so that the both of the second cam portions 8c, 16d are exactly in contact with each other when the abutting portion 16e is in contact with the upper end of the elongated hole 1b as described above. When there exists such a clearance in the initial state and if an unexpected strong impact or vibrations are exerted to the camera, the second drive member 16 may rotate clockwise and hence the second cam portion 16d may be brought into abutment with the second cam portion 8c of the first drive member 8. However, since the structure in the case of the present embodiment is adapted to cause the force of abutment to act toward the axis of rotation of the first drive member 8 (shaft 6), the action that rotates the first drive member 8 or the rotor 7 against the above-described force exerted to the rotor 7 does not occur. Therefore, even if irrespective strength of impact or vibrations applied thereto, the second drive member 16 is not rotated more than the extent corresponding to the minute clearance, and when the impact or the vibration is calmed down, the initial state can be restored by the force applied to the rotor 7 as described above.

In such an initial state, when a photographer confirms a photographic subject through an optical finder and presses the release button, the electric current is supplied to two coils including the coil 11 in the normal direction. Accordingly, since N-poles appear on the magnetic pole sections of the yokes 12, 13 and S-poles appear on the magnetic pole sections of the yokes 14, 15, the rotor 7 starts to rotate in the counterclockwise. Therefore, the first drive member 8 rotates counterclockwise from the state shown in FIG. 4A and operates the link member 17. However, in the initial state, since the longitudinal direction of the elongated hole 17b of the link member 17 and a track of a movement of the shaft member 18 are on substantially the same line, the link member 17 rotates little with respect to the shaft members 18, 19. Therefore, a load applied to the rotor 7 is extremely small, and the rotor 7 and the first drive member 8 are preferably activated, and the relation between the elongated hole 17b of the link member 17 and the shaft member 19 mounted to the second drive member 16 in terms of fitting position are to be changed, so that the second drive member 16 is not rotated. Then, a left end of the elongated hole 17b comes into contact with the shaft member 19 in due time, the state of which is shown in FIG. 4B.

From the state of FIG. 4B, the left end of the elongated hole 17b starts to push the shaft member 19. However, at this moment, since the second cam portion 8c of the first drive member 8 is already moved out of the track of the movement of the second cam portion 16d of the second drive member 16, the second drive member 16 is rotated clockwise, and by rotating the arm 20 clockwise by the drive pin 16f, the shutter blade starts the opening operation. FIG. 4C and FIG. 4D show a process of rotation of the second drive member 16 caused by the link member 17 in the manner described above. When the opening 1a is brought into a state right before it is completely opened thereafter as shown in FIG. 5, the first cam portion 8b of the first drive member 8 comes into contact with the first cam portion 16c of the second drive member 16 as shown in FIG. 4E.

From the state shown in FIG. 4E, the first drive member 8 directly pushes the first cam portion 16c of the second drive member 16 by the first cam portion 8b thereof without the intermediary of the link member 17 to make the second drive member 16 start rotation. Therefore, as shown in FIG. 4F, the shaft member 19 moves apart from the left end of the elongated hole 17b. The reason that such a structure is employed is that if the rotation via the link member 17 is continued also after the state shown in FIG. 4E is achieved, an amount of rotation of the second drive member 16 is reduced with respect to an amount of rotation of the first drive member 8, and hence a traveling speed of the shutter blade becomes extremely slow, and even when the first drive member 8 is rotated to the state shown in FIG. 4G, the second drive member 16 can rotate only to a position where the shaft member 19 comes into contact with the upper end of the elongated hole 17b, whereby the second drive member 16 cannot be rotated to a desired rotational angle position shown in FIG. 4G. Therefore, if it is not necessary to downsize the structure as is in the present embodiment, it is not necessary to form the first cam portions 8b, 16c on the first drive member 8 and the second drive member 16 or the elongated hole 17b on the link member 17, and a joint structure between the link member 17 and the second drive member 16 may be the same as the joint structure between the link member 17 and the first drive member 8. Although the joint structure between the elongated hole and the shaft is employed in a joint between the link member 17 and the second drive member 16 in the case of the present embodiment, it may be employed in the joint between the link member 17 and the first drive member 8.

When the shutter blade opens the opening 1a completely and hence a state shown in FIG. 6 is achieved, the abutting portion 16e of the second drive member 16 comes into abutment with a lower end of the elongated hole 1b formed on the shutter base plate 1. This abutment generates a force to rotate the second drive member 16 counterclockwise. However, in the case of the present embodiment, as is clear from FIG. 4G, three points, that is, a position of the shaft 6, a position of the shaft member 18, and a contact position between the two first cam portions 8b, 16c are aligned substantially on an identical straight line, and hence the force to move the second drive member 16 counterclockwise acts on from the contact position between the two first cam portions 8b, 16c substantially toward the axis of rotation (shaft 6) of the first drive member 8. Therefore, it does not act to rotate the first drive member 8 or the rotor 7 clockwise against the force applied to the rotor 7. Therefore, the second drive member 16 becomes standstill immediately without bounding. At this time, although the right end of the elongated hole 17b of the link member 17 seems to be in contact with the shaft member 19 in FIG. 4G, there exists a minute clearance therebetween in fact. The reason is for ensuring abutment between the abutting portion 16f of the second drive member 16 and the lower end of the elongated hole 1b formed on the shutter base plate 1.

Although it is also possible to adapt a structure to supply the electric current in the normal direction as described above to the two coils including the coil 11 continuously after the second drive member has stopped at a position shown in FIG. 4G, in the present embodiment, the rotor 7 can be kept in the stopped state reliably even after the supply of the electric current is stopped. The reason is that the rotor 7 is in a state of being rotated by about 40 degrees counterclockwise from the state shown in FIG. 2 at this moment, and hence a force to rotate counterclockwise is applied to the rotor 7 due to the opposed positions between the two magnetic pole sections of the rotor 7 and the two magnetic pole sections formed by the four yokes 12, 13, 14, 15.

When the shutter blade is stopped in a state shown in FIG. 6 in this manner, electric charge accumulated on a solid image pickup element thus far is discharged, and accumulation of electric charge for photographing is started. After having elapsed a predetermined period, an electric current in the opposite direction from before is supplied to the two coils including the coil 11 by a signal from a exposure time control circuit. FIG. 7A shows the same state as in the FIG. 4G. Therefore, when the electric current in the opposite direction as described above is supplied to the two coils, the rotor 7 starts to rotate clockwise from the state shown in FIG. 7A. Therefore, the first drive member 8 also starts to rotate clockwise from the state shown in FIG. 7A together with the link member 17. However, at the beginning, since there exists the above-described minute clearance between the right end of the elongated hole 17b and the shaft member 19, the second drive member 16 is not rotated, and the first cam portion 8b of the first drive member 8 is moved away from the first cam portion 16c of the second drive member 16. FIG. 7B shows a state in which the right end of the elongated hole 17b and the shaft member 19 are in contact with each other right after that.

From the state shown in FIG. 7B, the right end of the elongated hole 17b pushes the shaft member 19, and hence the second drive member 16 is rotated counterclockwise, and the arm 20 is rotated by the drive pin 16f counterclockwise, so that the shutter blade is caused to start the closing operation. FIG. 7C and FIG. 7D show a process in which the second drive member 16 is rotated by the link member 17 in this manner. When the shutter blade is brought into a state shown in FIG. 8, the second cam portion 8c of the first drive member 8 comes into contact with the second cam portion 16d of the second drive member 16 as shown in FIG. 7E. Therefore, from this state on, the first drive member 8 pushes the second cam portion 16d of the second drive member 16 by the second cam portion 8c without involving the link member 17, and causes the second drive member 16 to rotate directly, so that the shaft member 19 moves away from the right end of the elongated hole 17b.

Right after the shutter blade closes the opening 1a and a state shown in FIG. 7F is achieved, pushing operation of the second cam portion 8c of the first drive member 8 with respect to the second cam portion 16d of the second drive member 16 is released, and right after then, the abutting portion 16e of the second drive member 16 which has rotated by inertia comes into abutment with the upper end of the elongated hole 1*b* formed on the shutter base plate 1. With this abutment, the second drive member 16 is bounded clockwise. However, as will be understood from FIG. 7G, a distal end of the second cam portion 16*d* comes into abutment with a distal end of the second cam portion 8*c* of the first drive member 8 immediately. In addition, at this time, the three points; that is, the position of the shaft 6, the position of the shaft member 18, and the contact position between the two second cam portions 8*c*, 16*d* are substantially aligned on the identical straight line, and a repulsing force which is generated at the time of abutment acts toward the axis of rotation (shaft 6) of the first drive member 8. Therefore, it does not act to rotate the first drive member 8 or the rotor 7 counterclockwise against the force applied to the rotor 7.

In the case of the present embodiment, since the right end of the elongated hole 17*b* of the link member 17 pushes the shaft member 19 almost simultaneously with the abutment thereof, to rotate the second drive member 16 counterclockwise, the second drive member 16 finally stops in a state in which the abutting portion 16*e* is brought into contact with the upper end of the elongated hole 1*b*. Therefore, in the stopped state, a clearance exists between the second cam portion 8*c* of the first drive member 8 and the second cam portion 16*d* of the second drive member 16 even though it is an extremely minute clearance as described above. In this manner, when the shutter blade completely closes the opening 1*a*, image pickup information is transmitted from the solid image pickup element to a memory. When current supply to the two coils including the coil 11 is stopped, the state shown in FIG. 1, which is the standby state for the next photographing is restored.

In the description of operation described above, the case in which the focal plane shutter in the present embodiment is operated in the sequence of normally close type. However, it can also be operated in the sequence of the normally open type. In such a case, the state in which the shutter blade is completely open as shown in FIG. 6 corresponds to the initial state. Therefore, in the initial state, it is also possible to configure in such a manner that the photographic subject can be observed by a liquid crystal monitor. The photographing is performed by pressing the release button, thereby releasing electric charge accumulated in the solid image pickup element and starting a new chain of accumulation of electric charge. When a predetermined time period is elapsed after that, the shutter blade is made to perform the closing operation and, in the closed state shown in FIG. 1, image pickup information is transmitted from the solid image pickup element to the memory. Then, finally, the shutter blade is made to perform the opening operation to restore the initial state shown in FIG. 6.

Second Embodiment

Figure 9:
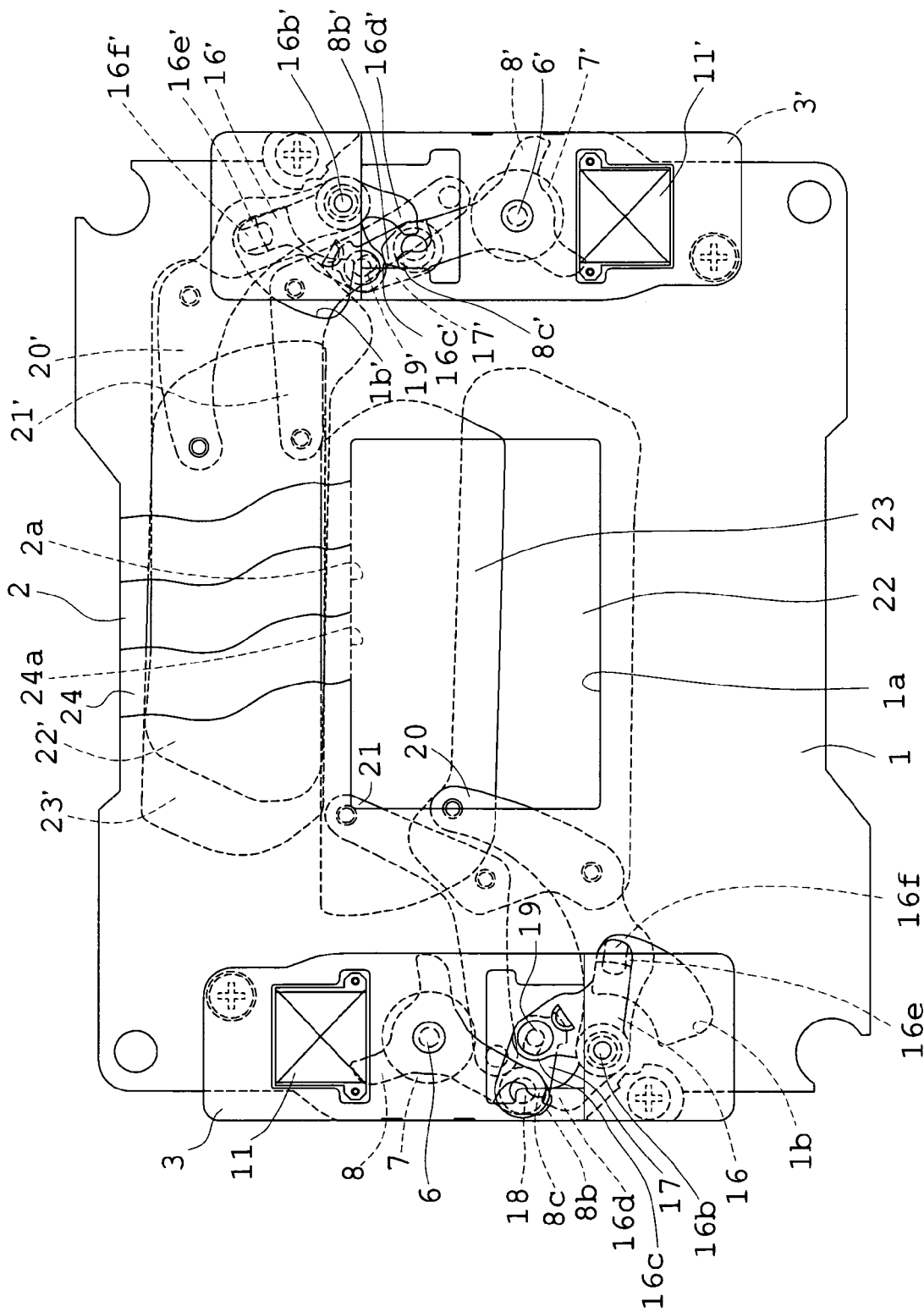
FIG. 9 is a plan view of a second embodiment of the present invention showing a state in which a first shutter blade closes the exposure aperture.
Figure 10:
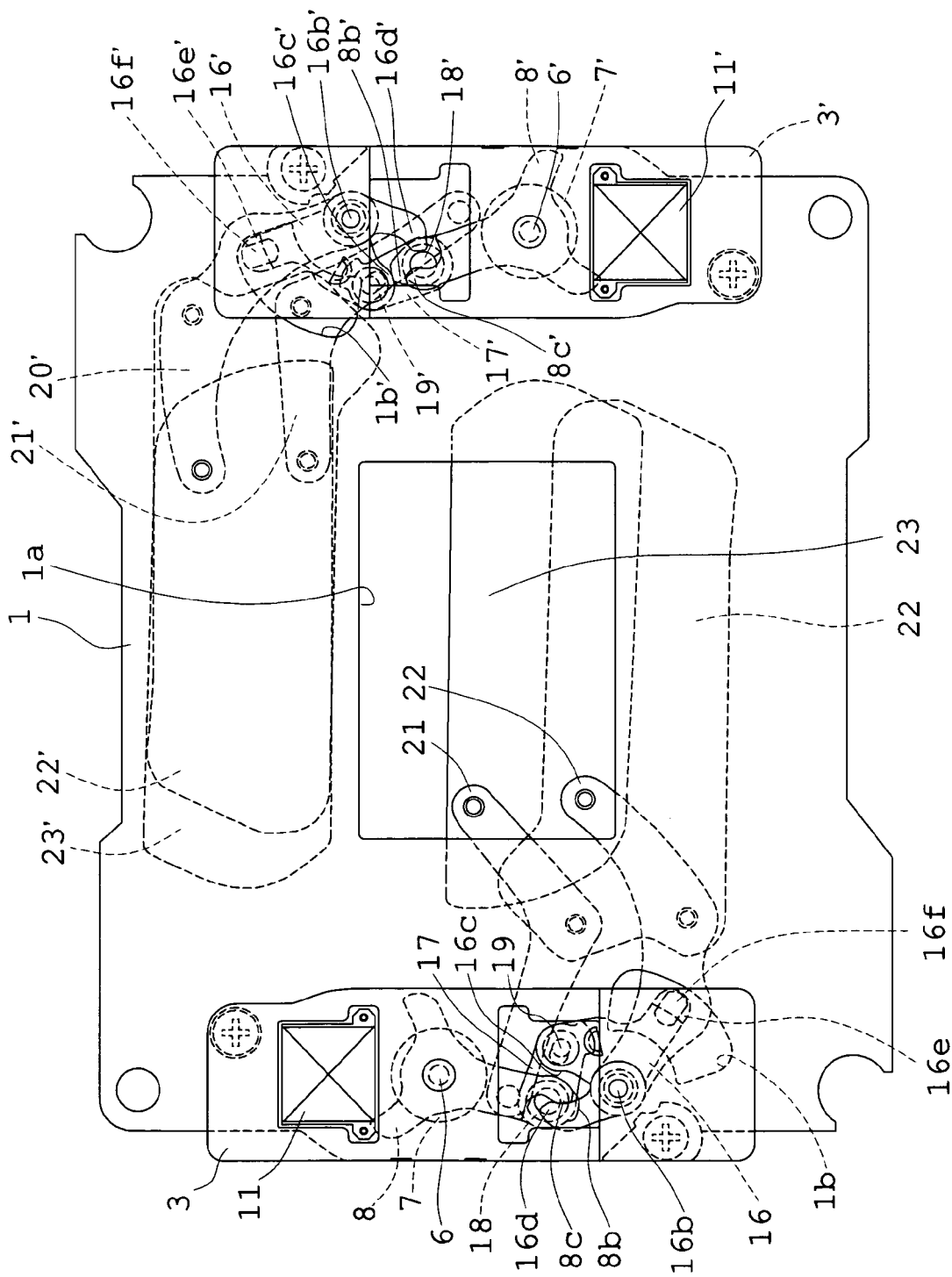
FIG. 10 is a plan view showing a state in which the exposure aperture is opened by substantially ⅓ after the first shutter blade starts the opening operation from the state of FIG. 9.
Figure 11:
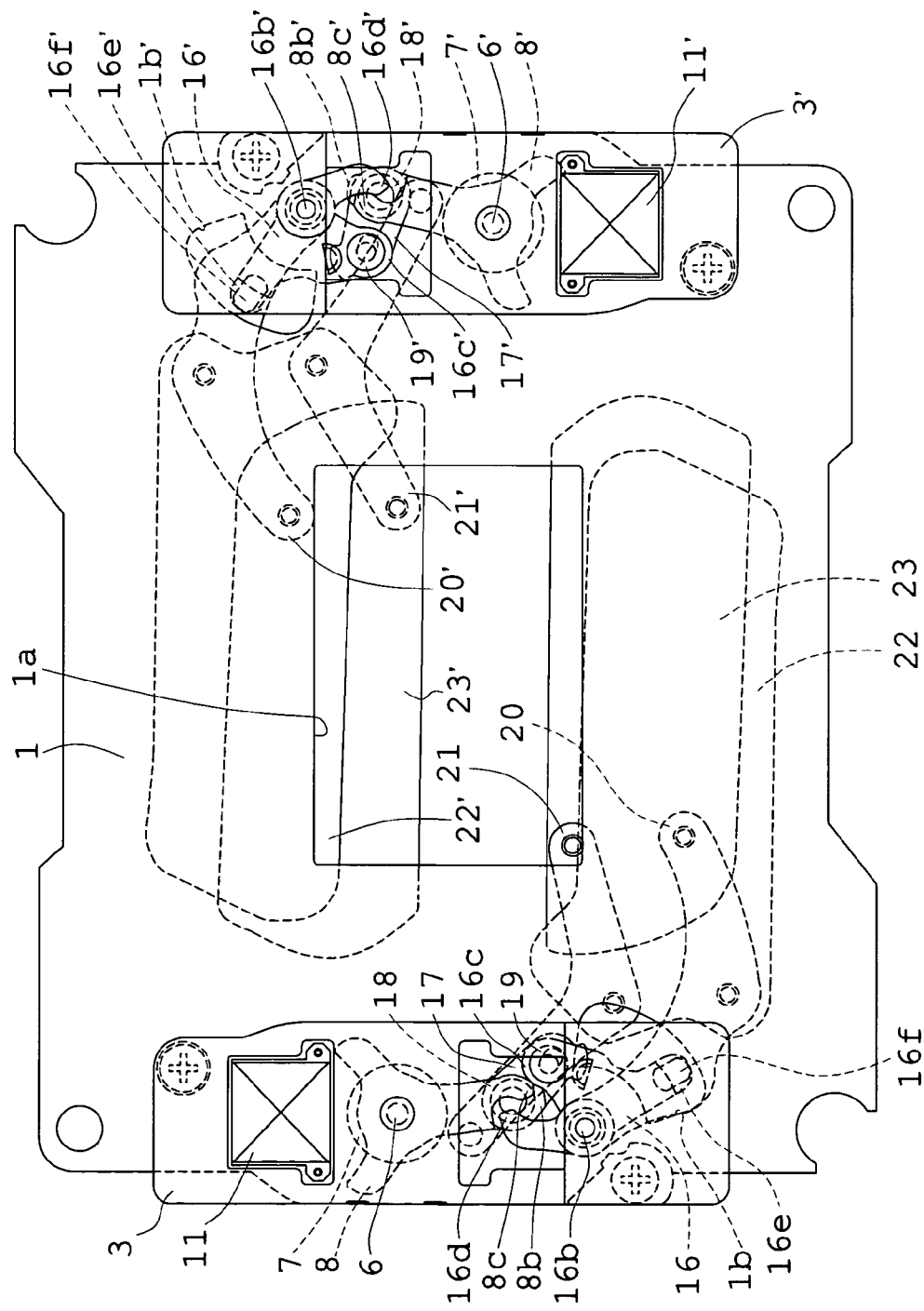
FIG. 11 is a plan view showing a state in which a second shutter blade is traveling in the exposure aperture for exposure together with the first shutter blade after the second shutter blade has started the closing operation from the state shown in FIG. 10.
Figure 12:
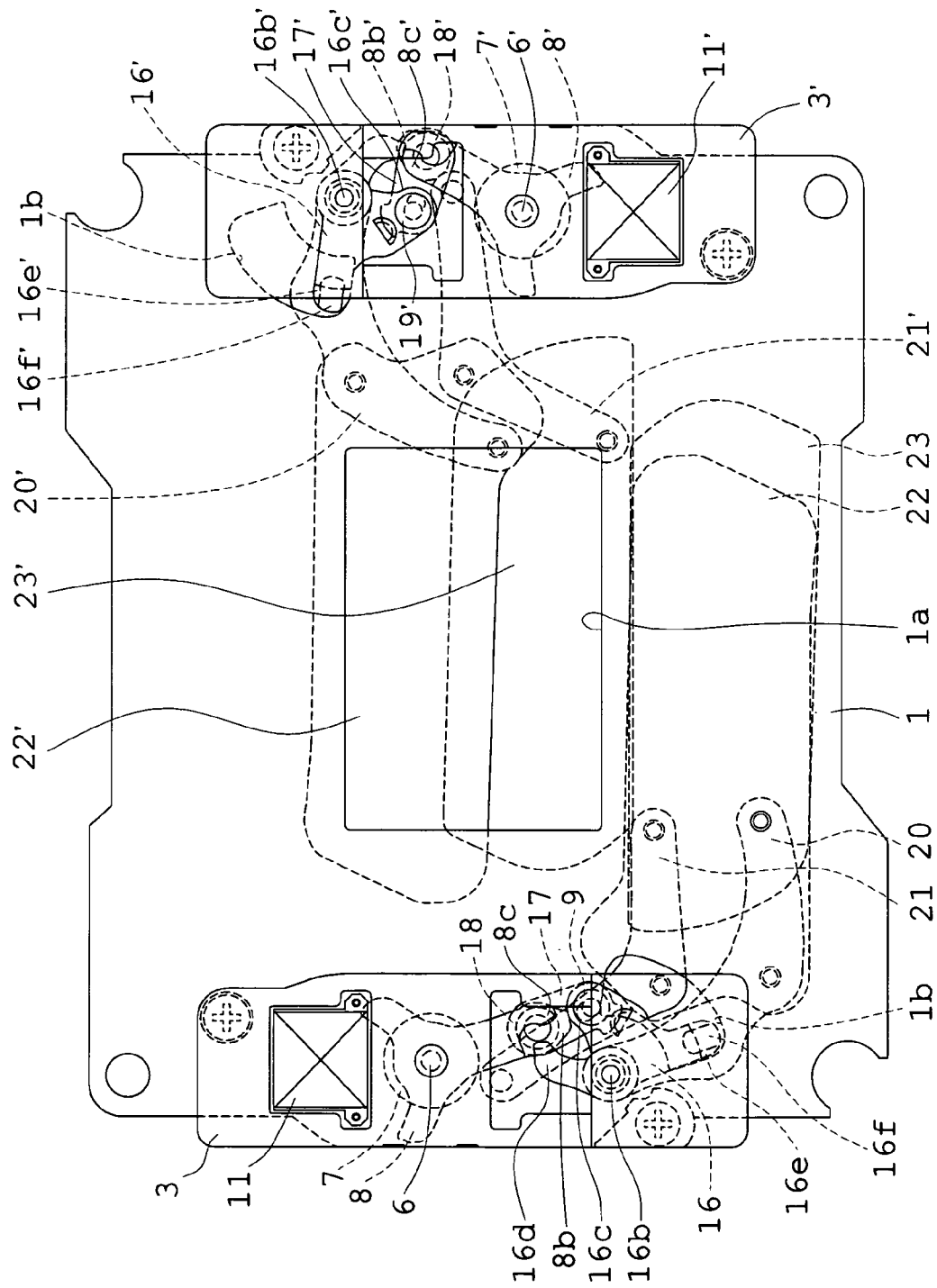
FIG. 12 is a plan view showing a state of the second shutter blade being stopped following the first shutter blade after the second shutter blade has closed the exposure aperture.

Subsequently, the second embodiment is described referring to FIG. 9 to FIG. 12. FIG. 9 is a plan view showing a state in which a first shutter blade closes the exposure aperture (initial state); FIG. 10 is a plan view showing a state in which the exposure aperture is opened by substantially ⅓ after the first shutter blade starts the opening operation from the state of FIG. 9; FIG. 11 is a plan view showing a state in which a second shutter blade is traveling in the exposure aperture together with the first shutter blade after the second shutter blade has started the closing operation from the state shown in FIG. 10; FIG. 12 is a plan view showing a state of the second shutter blade being stopped following the first shutter blade after the second shutter blade has closed the exposure aperture.

The present embodiment is a focal plane shutter including two shutter blades, and the shutter blades and the respective drive units for opening and closing the shutter blades are completely the same as the one described in the first embodiment. Therefore, in the respective drawings described above, members and portions which constitute one of the shutter blades (hereinafter, referred to as a first shutter blade) and the drive unit thereof are represented by the identical reference numerals to those in the first embodiment, and members and portions which constitute the other shutter blade (hereinafter, referred to as a second shutter blade) and the drive unit thereof are represented by the reference numerals used in the first embodiment added with a dash ('). Therefore, detailed description of the structure thereof is omitted, and detailed description of the operational process described in the first embodiment referring to FIG. 4 and FIG. 7 is also be omitted. Therefore, only points which are different from the first embodiment by the provision of two shutter blades are described as follows.

Since the present embodiment is provided with two drive units on the left and right sides with the intermediary of the opening 1*a*, the shutter base plate 1 and the auxiliary base plate 2 have substantially the same contour as in the first embodiment although those in the second embodiment are a laterally elongated shape in comparison with those in the first embodiment. FIG. 9 also shows a cross-sectional view from a part of shutter base plate 1. In the case of the present embodiment, an intermediate plate 24 having substantially the same shape as the shape of the shutter base plate 1 and the auxiliary base plate 2 in plan view is arranged between the shutter base plate 1 and the auxiliary base plate 2 at a predetermined distance therefrom, and is mounted to the shutter base plate 1 with means not shown. FIG. 9 also shows a cross sectional-view from a part of intermediate plate 24 and shows that an opening 24*a* having the same shape as the openings 1*a*, 2*a* is formed substantially at the center thereof. As described in the first embodiment, the shaft portion 1*j* provided on the shutter base plate 1 and the shaft portion 16*a* and the drive pin 16*f* of the second drive member 16 are inserted into the holes 2*d*, 2*c* and the elongated hole 2*b* of the auxiliary base plate 2 as is seen from FIG. 3. Therefore, the intermediate plate 24 is formed with holes or an elongated hole, not shown, so as not to give offence to the structure described above.

In FIG. 9, the drive unit mounted to the left side of the opening 1*a* and the first shutter blade arranged in the blade chamber between the shutter base plate 1 and the intermediate plate 24, and is moved reciprocally by the drive unit are completely the same structure as the one in the first embodiment. The drive unit mounted to the right side of the shutter base plate 1 and the second shutter blade arranged in the blade chamber between the intermediate plate 24 and the auxiliary base plate 2, and is moved reciprocally by the drive unit are mounted to the shutter base plate 1 inversely from the structure described in the first embodiment. However, in the case of the first shutter blade, the two arms 20, 21 are arranged on the side of the shutter base plate 1 with respect to the two blades 22, 23, while in the case of the second shutter blade, two arms 20', 21' are arranged on the side of the auxiliary base plate 2 with respect to two blades 22', 23'.

In this manner, the present embodiment is the focal plane shutter which includes the two shutter blades and hence can be employed for digital cameras and silver salt film cameras. When it is employed in a digital camera, it can be operated either in the normally open type or in the normally close type.

However, the focal plane shutter of this type is generally operated in the normally close type, and the operation in the normally close type is the same as the operation employed in a silver salt film camera. Therefore, in the description of the operation shown below, only the case for the focal plane shutter of the present embodiment employed in a digital camera and operated in the normally close type will be described.

FIG. 9 shows the initial state (standby state for photographing) of the present embodiment, and the first shutter blade covers the opening 1a with the two blades 22, 23 in a deployed state, and the second shutter blade is stored in the upper position of the opening 1a with the two blades 22', 23' in an overlapped state. Although the electric current is not supplied to the coil 11 and the other coil, not shown, at this time, a clockwise rotating force is applied to the rotor 7 for the reason described above, and hence the abutting portion 16e of the second drive member 16 is brought into contact with the upper end of the elongated hole 1b, and this state is maintained. As regards the other drive unit as well, although the electric current is not supplied to a coil 11' and the other coil, not shown, a counterclockwise rotating force is applied to a rotor 7', and hence an abutting portion 16e' of a second drive member 16' is brought into contact with the upper end of an elongated hole 1b', and this state is maintained.

When the photographer confirms the photographic subject through the optical finder and presses the release button in the initial state as described above, electric charge accumulated on the solid image pickup element thus far is discharged, and the electric current is supplied to the two coils including the coil 11 in the normal direction. Accordingly, the rotor 7 starts rotation counterclockwise with the first drive member 8, and right after that, rotates the second drive member 16 clockwise via the link member 17. Accordingly, since the drive pin 16f of the second drive member 16 rotates the arm 20 clockwise, the first shutter blade starts to open the opening 1a. FIG. 10 shows a state in which the first shutter blade opens the opening la by substantially ⅓. In this state, the electric current in the opposite direction is supplied to the two coils including the coil 11' of the other drive unit. The time period to supply electric current from the coil 11 or the like of one of the drive unit to the coil 11' or the like of one of the drive unit is determined by a photometric result of the brightness of the photographic subject.

When the electric current in the opposite direction is supplied to the two coils including the coil 11', the rotor 7' starts rotating clockwise with a first drive member 8', and right after that, rotates the second drive member 16' counterclockwise via a link member 17'. Accordingly, since a drive pin 16f' of the second drive member 16' rotates an arm 20' counterclockwise, the second shutter blade starts closing the opening 1a. FIG. 11 shows a state in which the second shutter blade has started closing the opening la in the manner described above and is in an exposure travel with a slit formed with respect to the first shutter blade. From the state shown in FIG. 11, in one drive unit, the first cam portion 8b of the first drive member 8 directly pushes the first cam portion 16c of the second drive member, and in the other drive unit, the second cam portion 8c of the first drive member 8 directly pushes the second cam portion 16d of the second drive member.

Subsequently, when the blade 23 of the first shutter blade is moved downwardly of the opening 1a, the abutting portion 16e of the second drive member 16 comes into abutment with the lower end of the elongated hole 1b of the shutter base plate 1. With this abutment, a force to rotate the second drive member 16 counterclockwise is generated. However, as described based on FIG. 4G in the first embodiment, the second drive member 16 becomes standstill immediately without bounding. Subsequently, when the blades 22', 23' of the second shutter blade finish closing the opening 1a, the abutting portion 16e' of the second drive member 16' comes into abutment with the lower end of the elongated hole 1b' of the shutter base plate 1. Although the second drive member 16' is slightly bounded clockwise with this abutment, the second drive member 16' is preferably restrained from bounding and stops as the description based on FIG. 7G in the case of the first embodiment.

When the second shutter blade is stopped in this manner in the state shown in FIG. 12, the image pickup information obtained by the solid image pickup element is transmitted to the memory, the electric current being supplied to the two drive units is stopped, whereby one photographing sequence is ended. Therefore, FIG. 12 shows the initial state for the next photographing operation, and for photographing next time, the second shutter blade is firstly made to start opening operation, and then the first shutter blade is made to start the closing operation.

In the above described respective embodiments, the rotor 7 (7') which is integrally formed with the first drive member 8 (8') is rotatably mounted to the shaft 6 (6') provided on the frame body 3 (3'). However, the invention is not limited thereto, and a structure in which a shaft is provided on the rotor 7 (7') which is integrally formed with the first drive member 8 (8'), and the shaft is supported, for example, by the shutter base plate 1 and the frame body 3 may also be applied without problem. Therefore, when the shaft is provided on the rotor 7 (7'), the first drive member 8 (8') and the rotor 7 (7') may be directly integrated as in the above-described respective embodiments, and alternatively, they may be integrated via the shaft.

Furthermore, the invention is not limited to the structure in which the rotor 7 (7') and the first drive member 8 (8') are integrally formed. In other words, a structure in which the rotor 7 (7') and the first drive member 8 (8') have individual axis of rotation arranged in parallel with each other, and the first drive member 8 (8') is adapted to rotate in association with the rotation of the rotor 7 (7'). In this arrangement, the drive unit cannot be downsized as in the case of the above-described respective embodiments. However, since both can be arranged apart from each other, it can be applied to various designs and specifications of the camera. However, it goes without saying that the repulsive force generated on the second drive member 16 (16') must act toward the axis of rotation of the first drive member 8 (8') as described above even in this arrangement.

What is claimed is:

1. A focal plane shutter for cameras comprising:
two base plates each having an exposure aperture and defining at least one blade chamber therebetween;
at least one shutter blade comprising a plurality of arms and at least one blade rotatably supported by the arms; each of the plurality of arms is rotatably mounted their one end to one of the base plates, the plurality of arms and at least one shutter blade being arranged in the blade chamber; and
at least one drive unit mounted to one of the base plates to cause the shutter blade move reciprocally,
wherein the drive unit comprises: a motor having a rotor which can rotate reciprocally, a first drive member rotating reciprocally with the rotor, a second drive member having a drive pin which is connected to one of the arms in the blade chamber to cause the shutter blade move reciprocally, the second drive member being rotatably mounted to any one of the base plates; and a link member connecting its one end to the first drive member and the other end to the second drive member for transmitting reciprocal rotation of the first drive member to the second drive member, and wherein the second drive member is in a state of being capable of coming into direct contact with the first drive member in the vicinity of the stop position thereof, so that a force from the second drive member acts substantially in the direction of an axis of rotation of the first drive member.

2. The focal plane shutter for cameras according to claim 1, wherein the first drive member comprises a cam portion in the vicinity of a joint with respect to the link member, and the second drive member comprises a cam portion in the vicinity of the joint with respect to the link member, so that when the rotor rotates in a first direction, the first drive member rotates the second drive member via the link member at the beginning and, from the midstream, rotates the second drive member via the cam portion of the first drive member which pushes the cam portion of the second drive member.

3. The focal plane shutter for cameras according to claim 2, wherein the first drive member comprises a second cam portion in the vicinity of the joint with respect to the link member, and the second drive member comprises a second cam portion at a position apart from the joint with respect to the link member, so that when the rotor rotates in the second direction, a second cam portion of the second drive member abuts against the second cam portion of the first drive member.

4. The focal plane shutter for cameras according to any one of the claims 1 to 3, wherein the rotor and the first drive member are capable of rotating integrally on the same axis of rotation.

5. The focal plane shutter for cameras according to any one of the claims 1 to 3, wherein the rotor and the first drive member are adapted to be rotated on different axes.

6. The focal plane shutter for cameras according to any one of claims 1 to 3, wherein the link member is connected to one of the two drive members with a joint structure between a shaft and a round hole and to the other drive member with a joint structure between the shaft and an elongated hole.

7. The focal plane shutter for cameras according to any one of claims 1 to 3, wherein the second drive member comes into contact with the first drive member when the second drive member abuts against a stopper when the operation of the shutter blade is ended.

8. The focal plane shutter for cameras according to claims 6, wherein the second drive member comes into contact with the first drive member when the second drive member abuts against a stopper when the operation of the shutter blade is ended.

* * * * *